United States Patent
Midtun et al.

(10) Patent No.: US 8,754,789 B2
(45) Date of Patent: Jun. 17, 2014

(54) POWER MANAGEMENT SYSTEM AND METHOD FOR MOBILE APPLICATIONS USING LOCATION BASED SERVICES

(75) Inventors: James D. Midtun, Chandler, AZ (US); Dave Anderson, Gilbert, AZ (US)

(73) Assignee: Mitel Networks Corporation, Ottawa, Ontario (CA)

( * ) Notice: Subject to any disclaimer, the term of this patent is extended or adjusted under 35 U.S.C. 154(b) by 255 days.

(21) Appl. No.: 12/592,461

(22) Filed: Nov. 24, 2009

(65) Prior Publication Data

US 2011/0124349 A1     May 26, 2011

(51) Int. Cl.
*G08G 1/123* (2006.01)

(52) U.S. Cl.
USPC .... 340/995.12; 340/992; 340/988; 455/456.1

(58) Field of Classification Search
USPC .......... 340/825.49, 988, 995.15, 426.19, 992; 342/357.09, 450, 451; 455/456.1–456.6
See application file for complete search history.

(56) References Cited

U.S. PATENT DOCUMENTS

| | | | |
|---|---|---|---|
| 6,330,446 B1 | 12/2001 | Mori | |
| 6,457,132 B1 | 9/2002 | Borgendale et al. | |
| 2005/0233780 A1 | 10/2005 | Jani et al. | |
| 2006/0116178 A1 | 6/2006 | Vuong et al. | |
| 2006/0211430 A1 * | 9/2006 | Persico | 455/456.1 |
| 2007/0082688 A1 | 4/2007 | Tu et al. | |
| 2007/0250257 A1 * | 10/2007 | Almy | 701/200 |
| 2008/0188216 A1 * | 8/2008 | Kuo et al. | 455/424 |
| 2009/0315767 A1 * | 12/2009 | Scalisi et al. | 342/357.07 |
| 2011/0050503 A1 * | 3/2011 | Fong et al. | 342/451 |

FOREIGN PATENT DOCUMENTS

WO    WO 2006/111822 A2    10/2006

\* cited by examiner

*Primary Examiner* — Hai Phan
*Assistant Examiner* — Ojiako Nwugo (57) ABSTRACT

A power manager for mobile applications using location based services. Generally described, the system and method manages power of a wireless device by adjusting the sampling rate of mobile applications that use location based services. In one illustrative embodiment, the power can be managed by establishing a schedule. The schedule can include settings such as a start time, end time, interval, and duration. These settings can be used to establish a window of time whereby multiple location samplings can take place. The schedule can minimize the user's involvement on a continual basis by allowing manual and automatic scheduling. The power manager can include, but is not limited to, three features to provide better power management for the wireless device. These can include scheduling for location sampling, automatic and learned scheduling, and frequency and duration dynamic modification. Through the power manager, the power supply on the wireless device can be maximized.

15 Claims, 8 Drawing Sheets

POWER MANAGEMENT SYSTEM AND METHOD FOR MOBILE APPLICATIONS USING LOCATION BASED SERVICES

TECHNICAL FIELD

This application generally relates to wireless devices, and more particularly, to power management of mobile applications that use location based services by manually or automatically adjusting a sampling rate.

BACKGROUND

Through mobile communication systems, such as wireless networks, two way communications can be provided. In addition, wireless networks can be used to provide a variety of mobile information and transaction services based on the location of the user. Mobile services can typically be provided through voice, text or graphical information. For example, a user can request information about the location of the nearest restaurant, ATM or other local amenity, and be presented with a graphical map, local address information, or directions.

Nonetheless, wireless devices using these mobile services encounter power drain resulting from the continuous location sampling by the wireless device. Currently, users of wireless devices can manually go into the application and turn off the location based services when such an option is available. Alternatively, the user can shut down the mobile application entirely instead of letting it run in the background. By shutting down the application, the location based service becomes unavailable defeating the purpose of providing location based services. Therefore, a need exists to provide a wireless device that overcomes the limitations described provided above.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

DESCRIPTION OF THE APPLICATION

The description set forth below in connection with the appended drawings is intended as a description of presently-preferred embodiments of the application and is not intended to represent the only forms in which the present application can be constructed and/or utilized. The description sets forth the functions and the sequence of steps for constructing and operating the application in connection with the illustrated embodiments. It is to be understood, however, that the same or equivalent functions and sequences can be accomplished by different embodiments that are also intended to be encompassed within the spirit and scope of this application.

Overview

The present application relates to mobile applications and more particularly, to a system and method for managing power by adjusting the location sampling rate used for location based services. In one illustrative embodiment, the power can be managed by establishing a schedule. The schedule can include settings such as a start time, end time, interval, and duration. These settings can be used to establish a window of time whereby multiple location samplings can be taken. The schedule can minimize the user's involvement on a continual basis. The schedule can be manually or automatically programmed and adjusted.

As will become apparent from the following description, multiple embodiments for the present application are provided and are not limited to the illustration described above. In one embodiment, the wireless device can take additional location samplings when the mobile application determines that a user is likely to be changing location. By way of example, additional samples can be taken based on calendar events, speed from a location sample, or native phone settings. In another embodiment, the wireless device can provide a learning mode where the wireless device takes frequent samplings to determine a user's daily or weekly routine and provide default settings based on those findings. The above embodiments represent a small set of applications in which the system can be used. One skilled in the relevant art will appreciate that the present application can be extended to multiple embodiments beyond those described above.

While the previous embodiments related to mobile applications, the power management features described below can also be applied to other elements on the wireless device. For example, power used by the display on the wireless device can be managed through those features described within the present application.

Networked Environment

Figure 1:
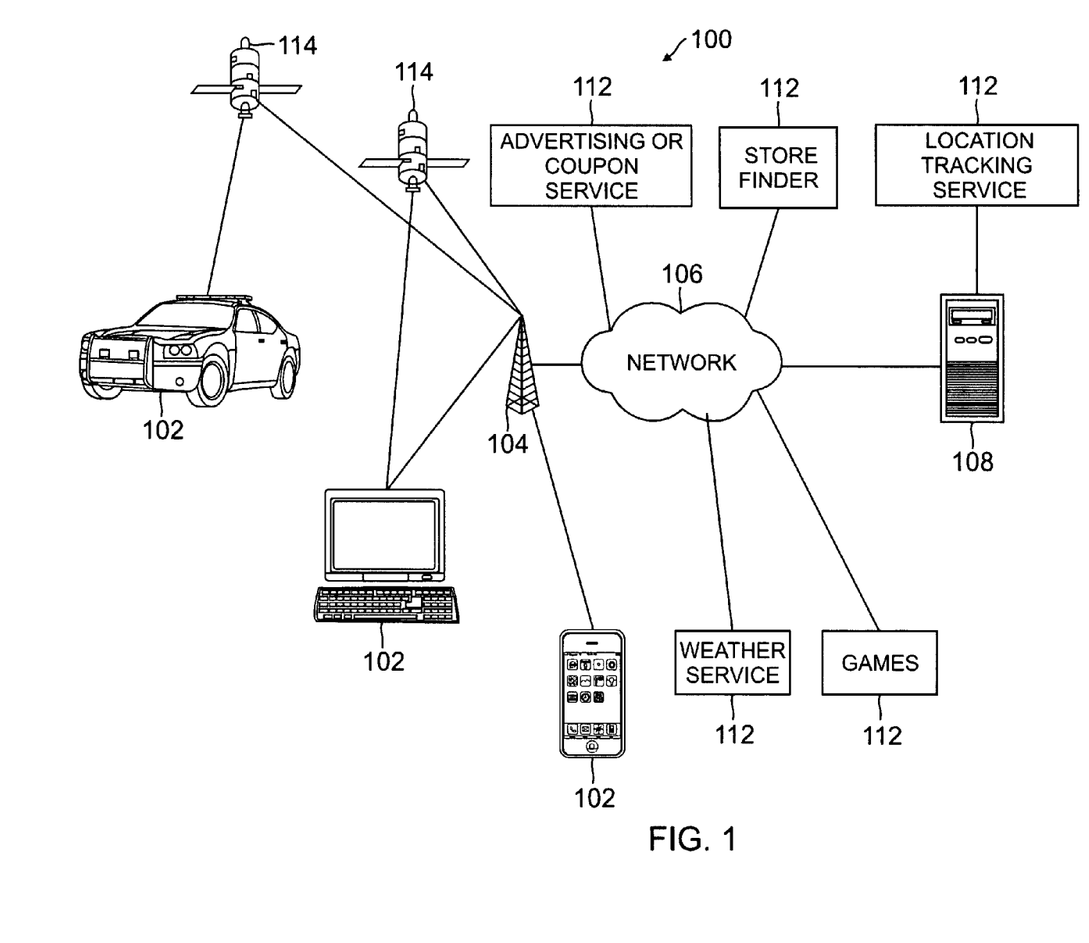
FIG. 1 illustrates an exemplary communications system that can be used for providing location based services in accordance with one aspect of the present application.

With reference now to FIG. 1, an exemplary system 100 that can be used for providing location based services 112 is presented. The system 100 can include wireless devices 102, a base station 104, a server 108, location based services 112, satellites 114, and a network 106 for connecting the components within the system 100. Those elements described within system 100 are for illustrative purposes and should not be construed as limiting the present application.

The wireless devices 102 can be any type of device that can communicate voice or data. Examples include a cellular telephone, a personal digital assistant, a pager, a text messaging device, a laptop, a portable music player, a two way radio, and a smart phone. In addition, wireless devices 102 can be placed on moving objects such as automobiles, as shown in FIG. 1. Wireless devices 102 can also be in the form of identification badges and the like.

To transmit and receive signals to and from a server 108, the wireless devices 102 can communicate with a base station 104. The wireless devices 102 and the base station 104 can communicate via a communications link, which typically includes a wireless portion. The signals can be used for wireless or mobile communications in a variety of ways. As provided above, the wireless device 102 can be placed within a car. Signals to and from the car can be provided to a satellite 114 and then forwarded to a land base station 104. In another embodiment, the wireless device 102 can take the form of a notebook computer. The notebook computer 102 can receive and provide signals to and from the satellite 114 or in the alternative, to the base station 104 directly.

The base station 104 can also include a wireless access point which sends and receives signals to and from the wireless device 102. Such a wireless access point includes any device that provides a wireless interface and provides connectivity to the server 108. Those skilled in the art will recognize the myriad of potential configurations surrounding the base station 104. Under these embodiments, the server 108 can effectively communicate with the base station 104 over the network 106.

The location based information can be provided by the wireless device 102 through a satellite 114, cellular location information, network analysis of location information, location information specific to a building, or other means for location determination. The location based information can be based on triangulation using cellular towers or access points. Alternatively, cellular carriers can employ other means of locating cellular telephones and other wireless devices 102 using cellular towers. In another embodiment, location information can be provided in the form of Global Positioning System ("GPS") coordinates. GPS can provide continuous positioning and timing information. With the timing and position information received from the satellites, the server 108 can triangulate the position of the wireless device 102. GPS systems can also measure altitude, speed, and direction of travel.

The network 106 can include, but is not limited to, any combination of the Internet, intranet, wide-area network (WAN), local-area network (LAN), personal-area network (PAN), campus-area network (CAN), metropolitan area network (MAN), global-area network (GAN), virtual private network, or any other type of network supporting communication between devices described herein. The network 106 can include both wired and wireless connections, including optical links. Many other examples are possible and apparent to those skilled in the art in light of this disclosure.

The server 108 of FIG. 1 can include one or more server computers, personal computers, workstations, web servers, or other suitable computing devices. The server 108 can include hardware elements that are coupled via a bus. These elements can include a microprocessor, a computer-readable storage media reader, a communications component, and a memory. The storage media reader can be further connected to a storage medium, the combination comprehensively representing remote, local, fixed, or removable storage devices or storage media for temporarily or more permanently containing computer-readable information. The communications component can comprise a wired, wireless, modem, or other type of interfacing connection and can permit data to be exchanged with other components of the server 108, or the network 106, among others.

According to embodiments of the present application, location based services 112 can be provided to the wireless devices 102. In one embodiment, the server 108 can be associated with a plurality of different location based services 112. By way of example, the location based service 112, connected to the server 108, can receive location information for tracking the location of the wireless device 102. The server 108, in some embodiments, can also connect to other location based services 112 through the network 106. In one example, the server 108 can connect to a location based service 112 to provide advertising or coupon services. In another embodiment, the location based service 112 can provide a store finder application, weather service, or games. Those skilled in the relevant art will appreciate that there are a number of different location based services 112 and those provided above are not intended to limit the scope of the present application.

Figure 2:
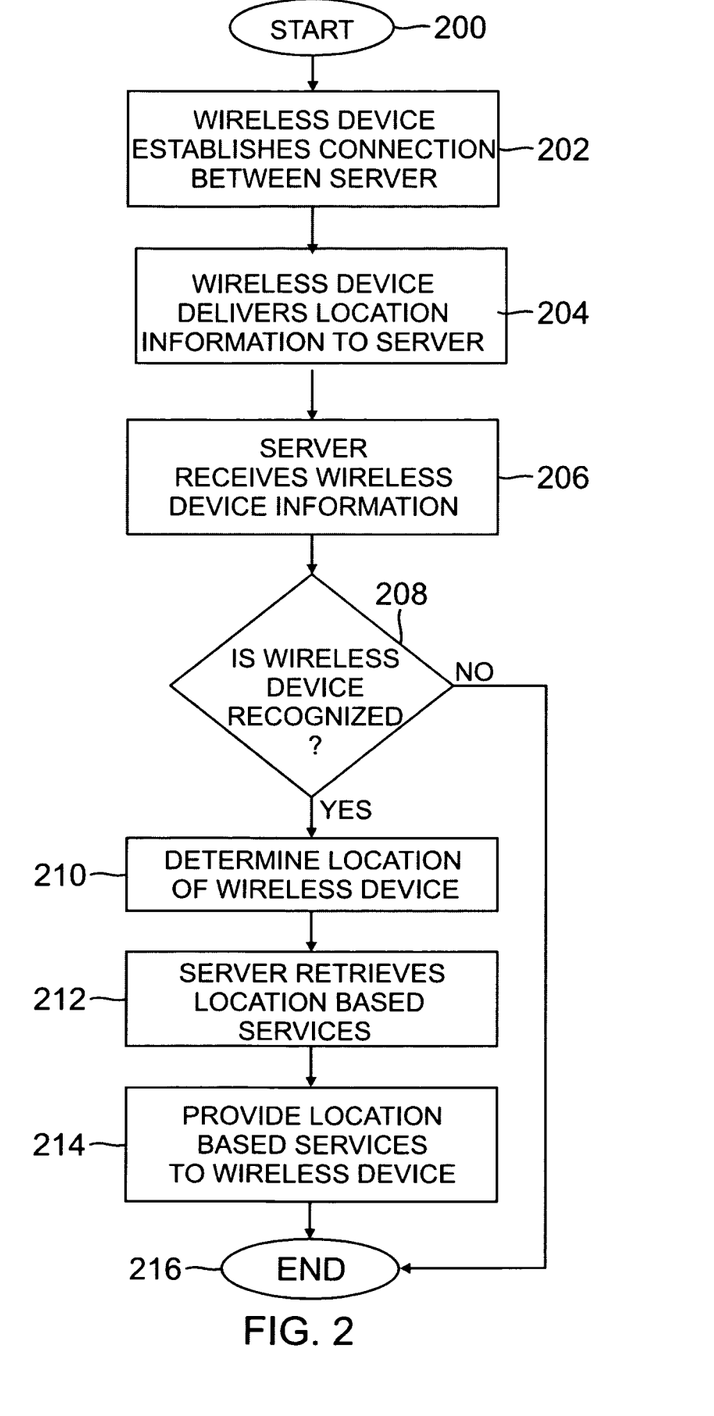
FIG. 2 provides a flow chart depicting exemplary processes for providing location based services in accordance with one aspect of the present application.

FIG. 2 represents a flow chart depicting exemplary processes for providing location based services 112. The flow chart begins at block 200. At block 202, the wireless device 102 can establish a connection with the server 108. If no connection can be established, the wireless device 102 can wait a period of time, and then try to re-establish the connection. If repeated attempts to establish a connection fail, the wireless device 102 can be placed into a power savings mode.

At block 204, the wireless device 102 can provide location information to the server 108. The server 108 can then receive the location information from the wireless device 102 at block 206. At decision block 208, the server 108 can determine whether the wireless device 102 is recognized. In some embodiments, the server 102 can apply specific settings for the wireless device 102 based on recognized devices 102. Decision block 208, in other embodiments, is not used. When the wireless device 102 is not recognized, the processes end at block 216.

When the wireless device 102 is recognized, the server 108 can determine the location of the wireless device 102 using the provided location information at block 210. At block 212, the server 108 retrieves locations based services 112 for the wireless device 102. In some embodiments, the server 108 can be directly associated with the location based services 112. In other embodiments, the location based services 112 can be provided through requests by the server 108 using the network 106. At block 214, the location based services 112 can be provided to the wireless device 102. The processes end at block 216.

Wireless Device

Wireless devices 102 can be provided in many forms as previously described. Within the wireless devices 102 can be components depicted in FIG. 3. The housing 344 can include a processor 316. The processor 316 can typically control overall operations of the wireless device 102. Input/output devices can also be connected to the processor 316 and can include a display 312, an auxiliary I/O 318, a serial port 320, a keyboard 322, a speaker 324, and a microphone 326. The wireless device 102 can also include a short-range communications subsystem 328. Memory devices can include flash memory 310 and random access memory (RAM) 314. Furthermore, the wireless device 102 can include other device subsystems 330. The wireless device 102 is preferably a two-way communication device having voice and data communication capabilities and preferably has the capability to communicate with other computer systems via the base station 104.

Figure 3:
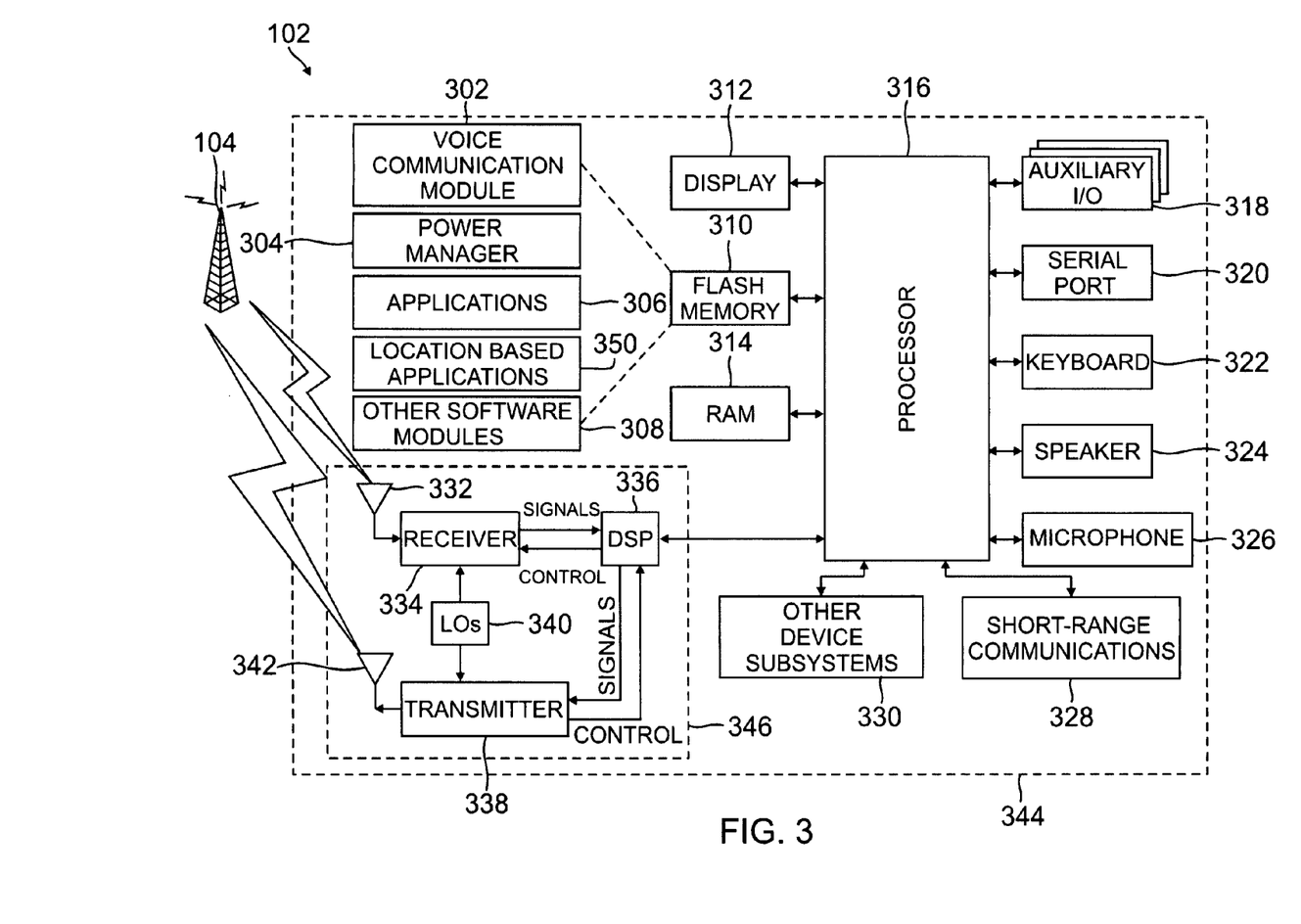
FIG. 3 shows typical components within a wireless device in accordance with one aspect of the present application.

Operating system software executed by the processor 316 is preferably stored in a persistent store, such as a flash memory 310, but can be stored in other types of memory devices, such as a read only memory (ROM) or similar storage element. In addition, system software, specific device applications, or parts thereof, can be temporarily loaded into a volatile store, such as RAM 314. Communication signals received by the wireless device 102 can also be stored to the RAM 314.

The processor 316, in addition to its operating system functions, can enable execution of software applications. A predetermined set of applications that control basic device operations, such as data and voice communications 302, can be installed on the wireless device 102. In addition, and in accordance with the present application, a power manager 304 can be provided. The power manager 304 can be used in conjunction with applications 306 and location based applications 112 as will be shown below. While described as primarily being implemented in software, the power manager 304 can be provided in hardware, software, or a combination of both. Other software modules 308 can be provided that enhance the functionality of the wireless device 102.

Communication functions, including data and voice communications, are typically performed through the communication subsystem 346, and possibly through the short-range communications subsystem 330. The communication subsystem 346 can include a receiver 334, a transmitter 338, and one or more antennas 332 and 342. In addition, the communication subsystem 346 can also include a processing module, such as a digital signal processor (DSP) 336, and local oscillators (LOs) 340. The specific design and implementation of the communication subsystem 346 is dependent upon the communication network in which the wireless device 102 is intended to operate.

Signals received from the communication network by the antenna 332 are routed to the receiver 334, which provides for signal amplification, frequency down conversion, filtering, channel selection, etc., and can also provide analog to digital conversion. Analog-to-digital conversion of the received signal allows the DSP 336 to perform more complex communication functions, such as demodulation and decoding. In a similar manner, signals to be transmitted to the network are processed by the DSP 336 and are then provided to the transmitter 338 for digital to analog conversion, frequency up conversion, filtering, amplification and transmission to the communication network via the antenna 342.

Power Manager

Figure 4:
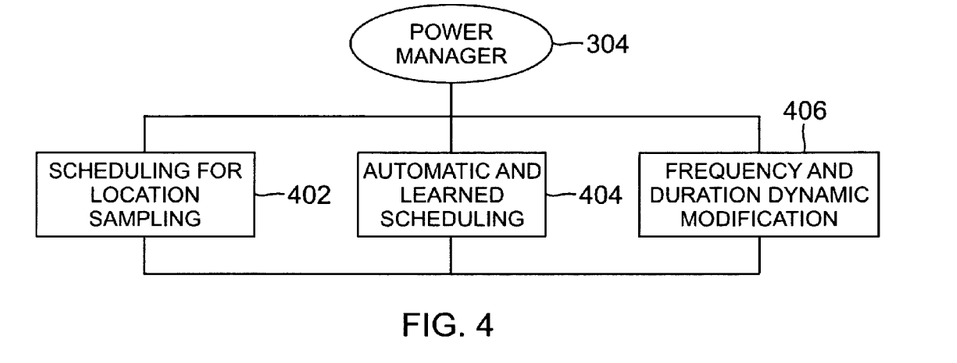
FIG. 4 depicts exemplary power management functions for the wireless device in accordance with one aspect of the present application.

As shown above, the wireless device 102 can include a power manager 304 for location based applications 350 which use location based services 112. FIG. 4 depicts exemplary features for the power manager 304 on the wireless device 102 which relate to location sampling and adjusting the rate of sampling. Through the power manager 304, the power drain properties by the location based applications 350 on the wireless device 102 are reduced so that the power supply on the wireless device 102 can be maximized. As will be shown, the location based applications 350 use periodic samples and not a continual sampling. In addition, the power manager 304 can provide for manual and automatic scheduling of the samplings.

In accordance with embodiments of the present application, the power manager 304 can include, but is not limited to, three features to provide better power management for the wireless device 102. These can include scheduling for location sampling 402, automatic and learned scheduling 404, and frequency and duration dynamic modification 406. Each of these features will be discussed in more details below. While each of these will be described separately, one skilled in the relevant art will appreciate that the features can be combined.

Scheduling for Location Sampling

Figure 5:
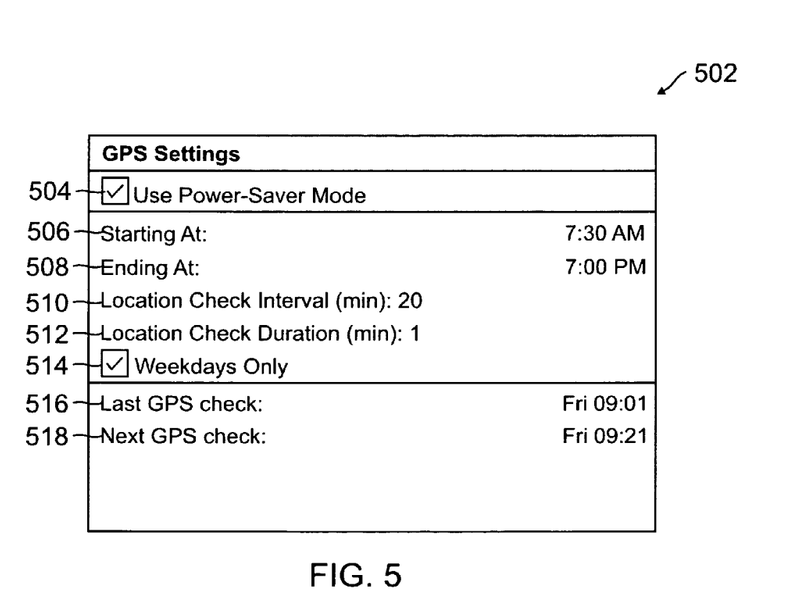
FIG. 5 represents a typical user interface for scheduling location sampling in accordance with one aspect of the present application.

Through the power manager 304, basic information for location based applications 350 can be set up. FIG. 5 represents a typical user interface 502 for scheduling location samplings 402. One skilled in the relevant art will appreciate that there are numerous types of interfaces that can be used to receive input and set up occurrences. Typically, the interface 502 can be used to control each location based application 350.

The interface 502 can be used for creating multiple occurrences within a windowed time frame. As shown, the user can set up some basic settings through the interface 502 for using location based services 112. In the embodiment, the user can specify whether to use a power-saver mode 504. By checking the box, the user can select the power-saver mode 504 for the wireless device 102.

To generate a window for sampling, the user can provide a start time 506 and an end time 508. The start time 506 can specify the time that the wireless device 102 should begin sampling the location of a wireless device 102. The end time 508 can specify the time that the wireless device 102 should stop sampling. In addition, the user can provide a location check interval 510 which determines how often a sample should be taken between the start time 506 and end time 508. This setting can also be referred to as "frequency" or "sampling rate". In some embodiments, the user can provide a location check duration 512. Generally, the interval 510 and the duration 512 are defined in minutes. Using the start time 506, end time 508, interval 510, and duration 512, the scheduling for location sampling feature 402 can provide a window where samples can be taken. The interface 502 can also receive input from the user to specify whether samples should be taken on weekdays only 512.

In one illustration, and as shown in FIG. 5, the user can provide a start time 506 of 7:30 AM and an end time 508 of 7:00 PM. In addition, the user can provide a duration 510 of twenty (20) minutes and an interval 512 of one (1) minute. Using these manually entered in inputs, the wireless device 102 can provide a first location sampling at 7:30 AM for a duration of one (1) minute. The wireless device 102 can then provide a second location sampling at 7:50 AM for one (1) minute. The process can continue until the end time 508 is reached.

While in the previous illustration the wireless device 102 began sampling at the start time 506, the first location sampling can be taken after the start time 506 and does not necessarily have to occur immediately. After a location sampling is performed, the time can be placed in the last check time 516. Thereafter, the next check time 518 can be calculated using the information provided within the interface 502.

While several exemplary values have been provided, they represent one illustration and should not be construed as limiting the values which can be manually entered into the interface 502. The user interface 502 can also check success and failures of the location sampling. This is further discussed in the frequency and duration modification feature 406 discussed below. Previously, the data was manually entered in. As will be shown below, the data can be automatically generated.

Figure 5A:
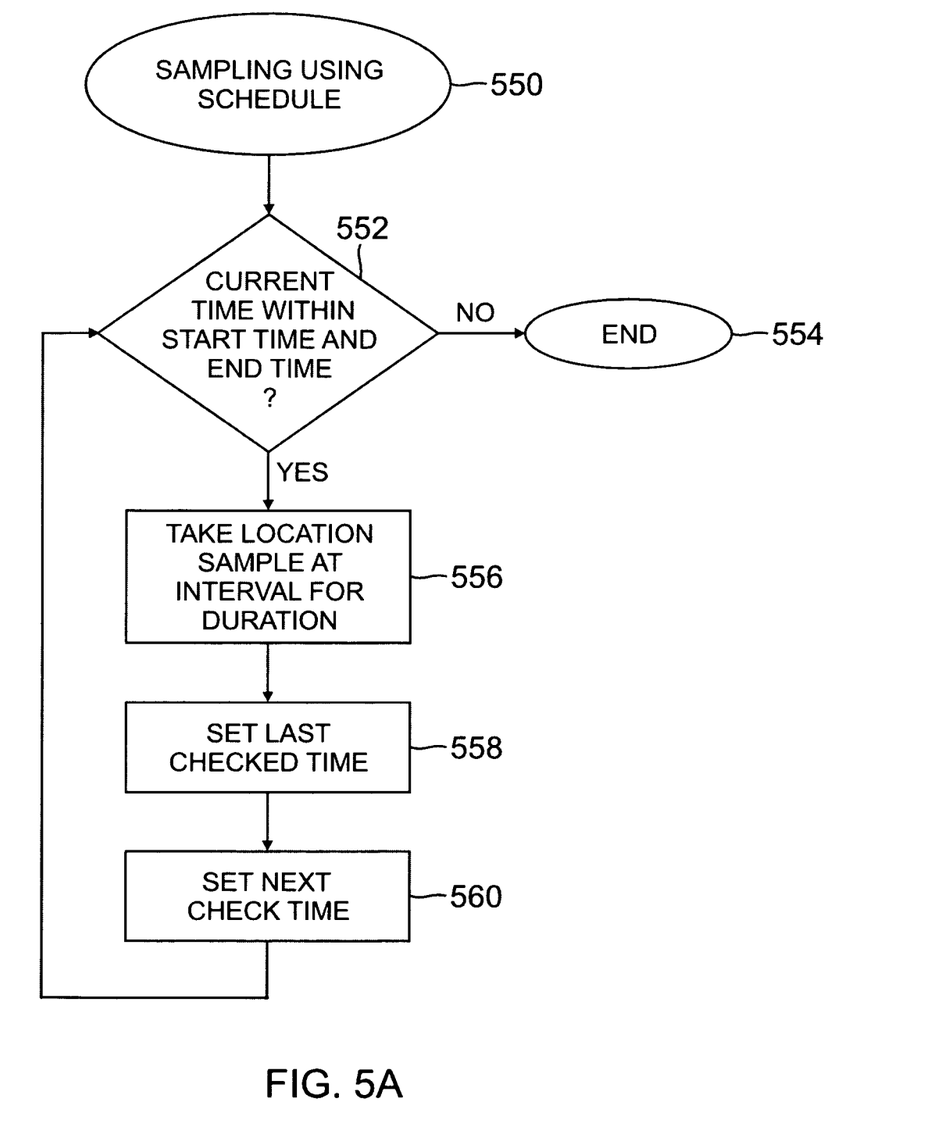
FIG. 5A is a flow chart showing exemplary processes for sampling using the schedule in accordance with one aspect of the present application.

FIG. 5A is a flow chart showing exemplary processes for taking location samples using the created schedule provided in FIG. 5. The wireless device 102 can start at block 550. At decision block 552, the wireless device 102 determines whether the current time is within the start time 506 and the end time 508. When the wireless device 102 determines that the current time is not within the start time 506 and the end time 508, the processes end at block 554. However, and if the current time is within the start time 506 and the end time 508, the wireless device 102 can take a location sample at the interval 510 for the duration 512 at block 556. At block 558, the wireless device 102 can set the last checked time 516. The wireless device 102 can also set the next check time 518. The wireless device 102 can then return to decision block 552.

Automatic and Learned Scheduling

Figure 6:
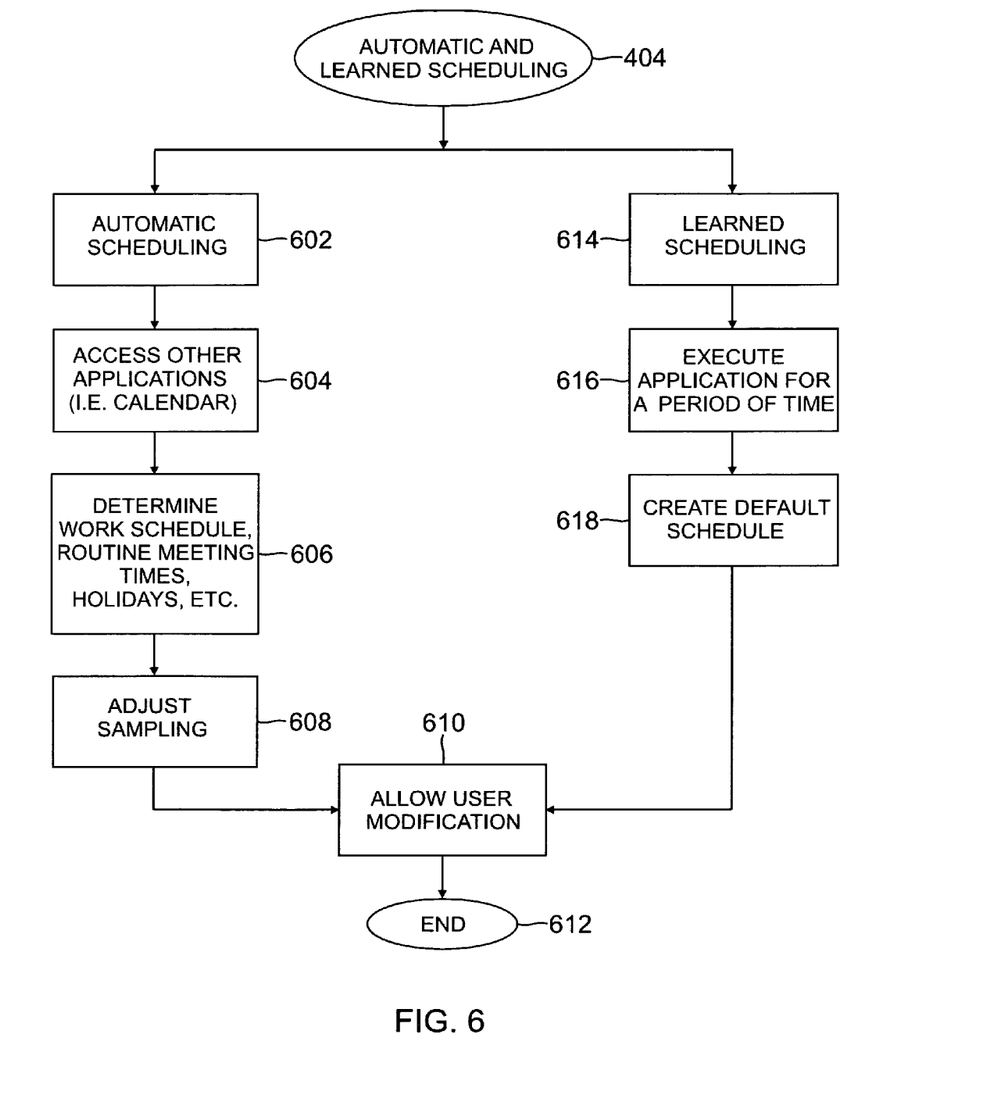
FIG. 6 is a flow chart depicting exemplary processes for automatic scheduling and learned scheduling in accordance with one aspect of the present application.
Figure 6A:
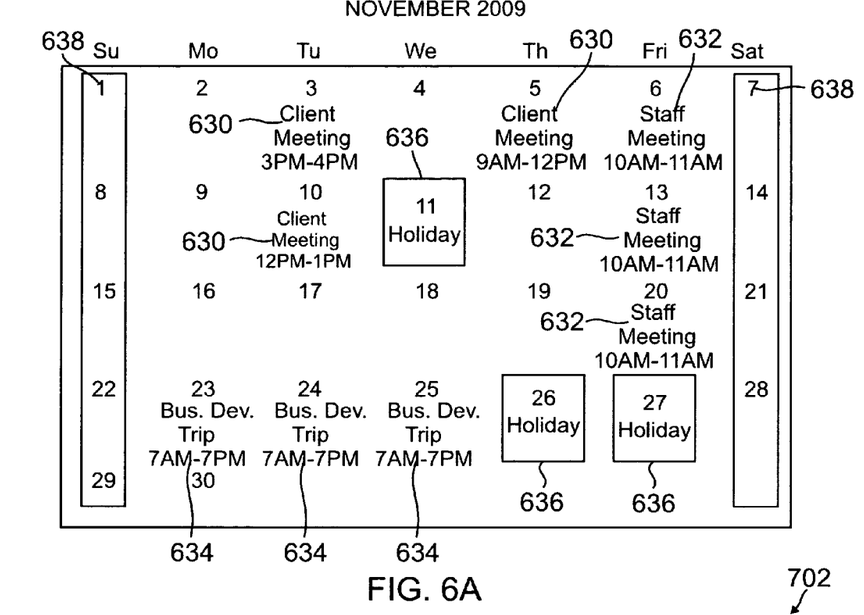
FIG. 6A illustrates an exemplary calendar which can be used for automatic scheduling in accordance with one aspect of the present application.

The power manager 304 can also be used to provide an automatic and learned scheduling feature 404. In FIG. 6, a flow chart depicting exemplary processes for automatic scheduling and learned scheduling 404 is provided. Automatic scheduling can start at block 602. At block 604, the wireless device 102 can access other applications 306 including a calendar application as depicted in FIG. 6A. As shown, the calendar application 306 can provide a list of different times where the sampling rate can typically be adjusted. For example, the calendar application 306 depicts times for client meetings 630, staff meetings 632, business development trips 634, holidays 636, and weekends 638. At block 606, the wireless device 102 can use the work schedule, routine meeting times, holidays, etc. to determine the sampling schedule. By taking the times indicated by the events on the calendar, the wireless device 102 can adjust the schedule as shown at block 608.

In addition to the calendar or separate therefrom, one skilled in the relevant art will appreciate that other applications 306 can also be used to adjust the sampling schedule. For example, a task application 306 can be used to adjust the schedule automatically. In addition, the application does not have to be a local application 306 but can be an application distributed over the network 106. By way of example, Google provides many applications that can be used to create or adjust the schedule. At block 610, the wireless device 102 can allow the user to modify the schedule that was created automatically. Automatic scheduling ends at block 612.

Another process that a user can employ is learned scheduling, which starts at block 614. At block 616, the wireless device 102 can execute the application for a period of time. Typically, the application can run for several days or weeks with the location based services 112 running continuously. In other embodiments, this could take hours. Through this learning period, the power manager 304 can learn and create a default schedule based on the movements of the wireless device 102 at block 618. In one embodiment, the schedule can be implemented immediately. In the alternative, the schedule can be implemented slowly by lowering the frequency of the location samplings and decreasing the "on-time" over a period of time following the initial learning period. At any point following the creation of the schedule, a user can modify the schedule manually or restart the learning process at block 610. The process ends at block 612.

The learning process described above can learn from other behaviors of the wireless device 102 to create the sampling schedule. It could consider other factors such as changes to phone settings. These phone settings can include, but are not limited to, vibrate mode, airplane mode, sleep settings, etc.

Frequency and Duration Dynamic Modification

Figure 7:
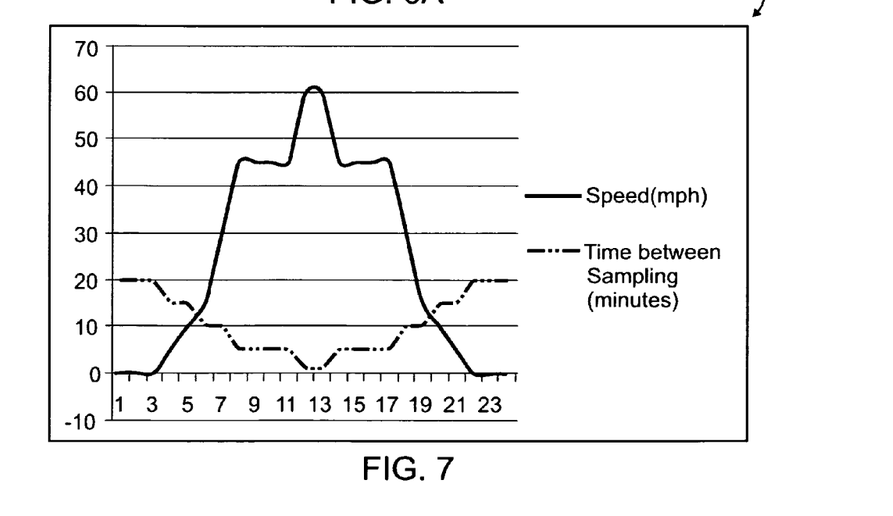
FIG. 7 provides a graph representing illustrative speed and time intervals in for monitoring a wireless device's movement in accordance with one aspect of the present application.

The power manager 304 can also provide a frequency and duration dynamic modification feature 406. By way of example, FIG. 7 provides a graph 702 representing illustrative speeds and time intervals for a wireless device 102. The graph 702 illustrates the concept of using speed to modify a user's sampling frequency. At higher speeds, typically the sampling frequency can be increased and in the alternative, at lower speeds, the sampling frequency is decreased. By adjusting the frequency, more accurate and up-to-date location samplings are provided to the location based services 112.

Figure 7A:
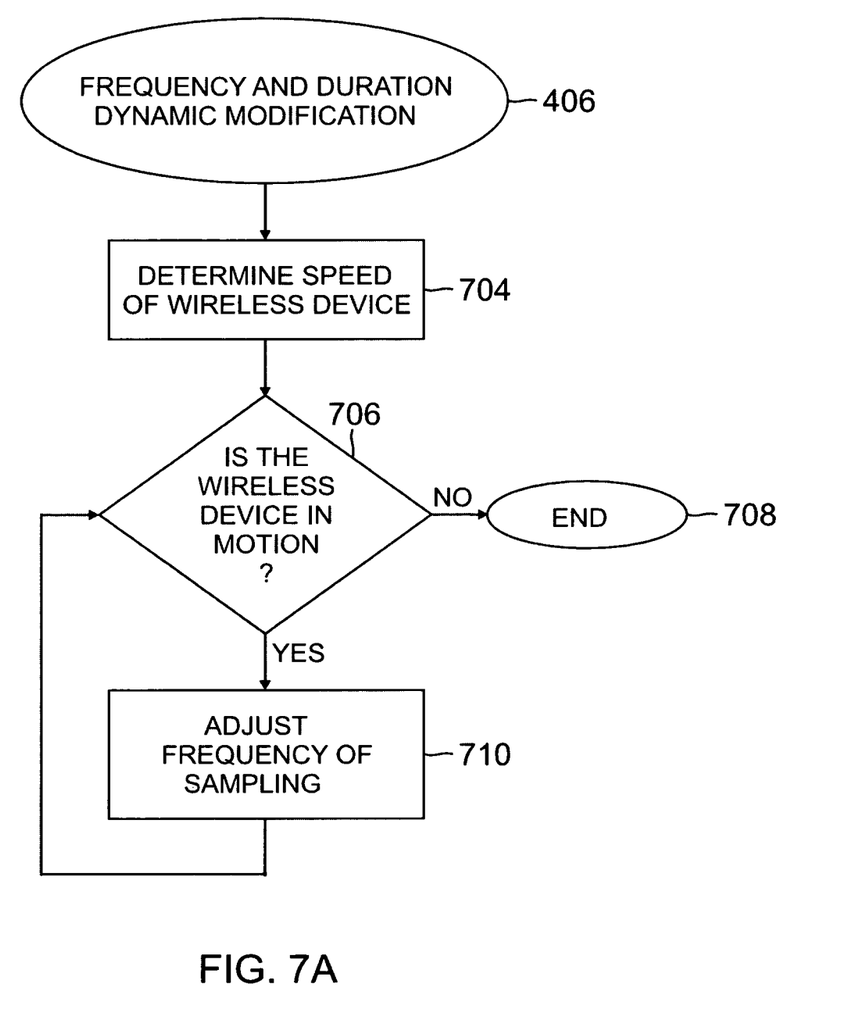
FIG. 7A is a flow chart showing exemplary processes for frequency and duration dynamic modification in accordance with one aspect of the present application.

FIG. 7A is a flow chart showing exemplary processes for the frequency and duration dynamic modification feature 406. At block 704, the wireless device 102 can check the speed at which the user is traveling. From this, the wireless device 102 can determine whether the user is in motion at decision block 706. If the user is not in motion, the processes end at block 708.

However, when the user is in motion, the wireless device 102 can adjust its sampling frequency at block 710. Typically, more frequent or constant sampling can occur until the user reaches a destination and the speed of the user stabilizes at a zero or near-zero value. This speed check can also be used to extend the user's end time 508 to help ensure that the user's final setting for the day is not taking while in transit. This speed modification can allow users to set the normal interval 510 check at a higher value, but still be insured that major location changes can still be handled rapidly. The processes can return to decision block 706 after adjusting the frequency.

The frequency and duration dynamic modification feature 406 can also include calendar checking. The application can use a calendar to determine likely times when a user's location can be changing and modify the frequency of the samples around these times to get a more accurate reading of the user's location. The frequency and duration dynamic modification feature 406 can also determine that a user's location sampling is experiencing frequent failures. In the case of GPS, often times depending on the user's location, it can be difficult for the wireless device 102 to get a GPS lock during the defined duration. The feature 406 can extend duration times and increase the frequency of checks following failures. It can also allow for a setting of "sample until success" instead of a strict duration time. It can provide for the storing of this success/failure information and supply it to the user for other applications.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A wireless device comprising:
a power source;
at least one processor; and
a memory operatively coupled to said processor, said memory storing program instructions that when executed by said processor, causes said processor to:

provide location information to a location based service at a sample rate;

access a calendar application having at least one calendar entry specific to a user of the device;

create a location sampling schedule automatically for a duration of said at least one calendar entry;

adjust said sample rate based upon said schedule and said calendar application to maximize said power source, wherein said sample rate is modified automatically when said entry indicates that said user is likely to be changing locations.

2. The wireless device of claim 1, wherein adjusting said sample rate to maximize said power source is adjusted manually.

3. The wireless device of claim 2, wherein said memory storing program instructions, when executed by said processor, further causes said processor to display a scheduler for receiving manually entered data.

4. The wireless device of claim 3, wherein said scheduler comprises a start time, an ending time, a location check interval, and a location check duration.

5. The wireless device of claim 1, wherein adjusting said sample rate to maximize said power source is adjusted automatically.

6. The wireless device of claim 5, wherein said sample rate is adjusted automatically using an associated calendar application.

7. The wireless device of claim 5, wherein said sample rate is adjusted automatically using a learning period and creating a schedule for said sampling rate from said learning period.

8. The wireless device of claim 1, wherein said sample rate is adjusted dynamically.

9. The wireless device of claim 8, wherein said sample rate is adjusted dynamically based upon speed of said wireless device.

10. The system of claim 1, wherein said sample rate increases following failures to communicate with at least one server.

11. A computerized method for managing power on a mobile device having applications that use location based services, said method comprising:

accessing a calendar application having at least one calendar entry specific to a user of said mobile device;

establishing a location sampling schedule for said applications that use said location based services by determining the user's whereabouts for a duration of the at least one calendar entry; and adjusting a sampling rate of location information of said mobile device based upon said location sampling schedule, wherein said sample rate is modified automatically when said entry indicates that said user is likely to be changing locations.

12. The computerized method of claim 11, wherein establishing a sampling schedule comprises:

receiving a start time, an end time, an interval, and a duration;

creating multiple occurrences between said start time and said end time using said interval for said duration; and creating said sampling schedule using said multiple occurrences.

13. The computerized method of claim 11, wherein establishing a sampling schedule further comprises:

sampling location information of said mobile device for a period of time;

determining movements from said period of time; and creating said sampling schedule based on said movements.

14. The computerized method of claim 11, wherein establishing a sampling schedule further comprises:

evaluating a speed of said mobile device, said speed indicating whether said mobile device is in motion; and adjusting sampling rates based on said speed of said mobile device.

15. The computerized method of claim 14, wherein evaluating said speed of said mobile device occurs until said speed stabilizes to zero.

* * * * *